(12) United States Patent
Teich et al.

(10) Patent No.: US 6,226,368 B1
(45) Date of Patent: May 1, 2001

(54) SYSTEM AND METHOD FOR AUTOMATICALLY UPDATING A CLOCK USING CALLER ID INFORMATION

(75) Inventors: Paul Teich; David J. Borland, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/082,644

(22) Filed: May 21, 1998

(51) Int. Cl.[7] ............................ H04M 1/56; H04M 15/06
(52) U.S. Cl. ........................ 379/142; 379/93.23; 368/10
(58) Field of Search .................. 379/112–113, 133–134, 379/120, 127, 142, 354, 93.23; 368/4, 10, 46, 47, 13, 30; 455/414–415

(56) References Cited

U.S. PATENT DOCUMENTS

| | | | |
|---|---|---|---|
| 5,398,279 | * | 3/1995 | Frain ................................. 379/140 |
| 5,546,448 | * | 8/1996 | Caswell et al. ..................... 379/142 |
| 5,581,599 | * | 12/1996 | Tsuji et al. ......................... 455/415 |
| 5,646,979 | * | 7/1997 | Knuth ................................. 455/563 |
| 5,875,240 | * | 2/1999 | Silverman .......................... 379/142 |
| 5,881,023 | * | 3/1999 | Gu et al. ............................. 368/10 |
| 5,887,253 | * | 3/1999 | O'Neil et al. ...................... 455/418 |

* cited by examiner

Primary Examiner—Duc Nguyen
(74) Attorney, Agent, or Firm—Conley, Rose & Tayon PC; Jeffrey C. Hood

(57) ABSTRACT

An improved telephone system with additional features that enable a user or users to make more effective use of their telephone service. The present invention comprises an improved telephone system and method for updating a clock using caller ID information. In one embodiment, the clock is located in a remote device from a caller ID unit, and is updated automatically by information received from the caller ID unit through existing wiring in a building's power grid. In another embodiment, the clock is located in a portable telephone handset, and the caller ID unit may be located either in the portable telephone handset or in a portable telephone base station.

18 Claims, 2 Drawing Sheets

SYSTEM AND METHOD FOR AUTOMATICALLY UPDATING A CLOCK USING CALLER ID INFORMATION

BACKGROUND OF THE INVENTION

1. Field of the Invention

The present invention relates to a telephone system and method for using time information transmitted at the beginning of phone calls to update the system time of a phone, other clocks, and computer systems.

2. Description of the Related Art

Telephone subscribers communicate via a vast telephone network, referred to as the Public Switched Telephone Network (PSTN). In the present disclosure, the term "PSTN" is intended to include the analog telephone network or POTS (Plain Old Telephone Service), ISDN (Integrated Services Digital Network), DSL (Digital Subscriber Line), and Wireless Local Loop (WLL), among others.

A telephone subscriber's communications devices, e.g., telephones, are typically connected in parallel to a telephone line which links a subscriber's premises to a telephone service provider's central office. An ordinary telephone is the most familiar of such communications devices. An ordinary telephone includes a handset, and the handset includes a receiver and a transmitter. The receiver is designed to be placed over a user's ear during use, and the transmitter designed to be positioned in close proximity to the user's mouth during use.

In a POTS system, when the telephone is not in use, the telephone is disconnected from the telephone line, except for a ringer circuit. When a caller places a telephone call to a receiving party, switching equipment in the central office transmits a series of ring signals over the receiving party's telephone line. The ring signals cause the ringer circuit of the receiving party's telephone to generate sounds which alert the receiving party to the incoming telephone call. At the same time, the switching equipment sends a series of ring-back signals to the caller to let the caller know that the telephone call is being placed. When the receiving party answers the incoming telephone call, a communication is established between the caller and the receiving party.

Several different types of communications devices are designed to automatically transmit or receive information following detection of one or more ring signals. Examples of such communications devices include telephone answering machines and communications devices equipped with modulator-demodulators (modems). An answering machine typically includes control circuitry which electrically connects a voice message unit to the telephone line after a predetermined number of ring signals are detected, causes the voice message unit to transmit (i.e., play back) a pre-recorded outgoing voice message, and then receives and records any incoming voice message transmitted by the caller following transmission of the outgoing voice message. Digital communications devices equipped with modems exchange frequency-encoded information via the telephone network. Facsimile (fax) machines are examples of such digital communications devices. A fax machine typically includes control circuitry which electrically connects a modem to a telephone line after a predetermined number of ring signals are detected, then either transmits or receives frequency-encoded digital information. A modulator portion of a modem within a transmitting fax machine converts a digital value (i.e., a logic one or a logic zero) to a corresponding analog tone. A demodulator portion of a modem within a receiving fax machine performs the opposite function, converting the analog tone to the corresponding digital value.

Telephone service providers also offer "caller ID" services which provide information about a caller. Devices which receive, store, and display digital caller ID information are widely available. The caller ID service is typically available to telephone subscribers for a small additional monthly fee. Under current standards, frequency-encoded digital caller ID information is transmitted between the first and second ring signals. Information about a caller is thus received, stored, and displayed by a caller ID device before a user would normally answer a ringing telephone. Caller ID information is typically recorded by caller ID devices whether the associated telephone is answered or not. Caller ID circuitry may be included as part of a telephone or the caller ID circuitry may be part of a separate box that is also connected to the telephone line.

A telephone system would be desirable that provides the user or the users with additional features for a more effective use of their telephone service. For example, one desirable feature for a telephone system would be a feature that could automatically update thesystem time of a phone or the time of a clock using the time from caller ID information. This would be advantageous after temporary power outages, especially so for phones and answering machines that are difficult to program.

SUMMARY OF THE INVENTION

The present invention comprises an improved telephone system with additional features that enable a user or users to make more effective use of their telephone service.

The present invention comprises a method for automatically updating a clock using caller ID information. The method comprises the steps of receiving an incoming telephone call from a caller, receiving caller ID information that includes the time of the incoming telephone call along with the telephone signal, decoding the caller ID information to obtain the time of the incoming telephone call, transmitting the time of the incoming telephone call to a clock, the clock receiving the time of the incoming telephone call, and the clock updating the time used by the clock using the received time of the incoming telephone call.

The present invention further comprises a system for updating a clock using caller ID information. The system includes a telephone port for coupling to a telephone line for receiving a telephone signal, a caller ID decoder that receives the telephone signal from the telephone port and determines the time of the incoming telephone call from information included in the telephone signal, and a clock that receives the time of the incoming telephone call from the decoder and uses it to update the current time used by the clock. The clock may display the current time or it may use the current time for other purposes, such as time-stamping. The clock may be located in the same unit as the caller ID decoder, or it may be located in a remote device.

Still further, the present invention comprises a system for generating a time signal using caller ID information. The system includes a telephone port for coupling to a telephone line for receiving a telephone signal, a caller ID decoder that receives the telephone signal from the telephone port and determines the time of the incoming telephone call from information included in the telephone signal, and an output port that receives the time of the incoming call from the decoder. The output port is operable to provide the time of the incoming telephone call to one or morelocal or remote devices.

BRIEF DESCRIPTION OF THE DRAWINGS

Other objects and advantages of the invention will become apparent upon reading the following detailed description and upon reference to the accompanying drawings in which.

Figure 1:
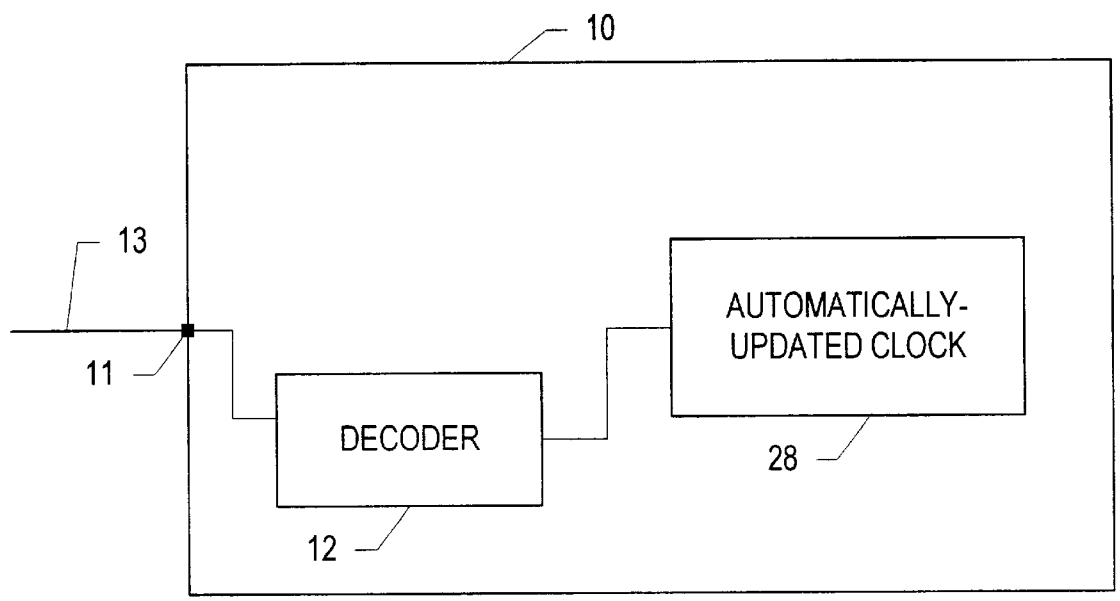
FIG. 1 shows a system for updating a clock using timing information received over a telephone line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The present invention comprises an improved caller ID unit that receives caller ID information comprising the time of the incoming telephone call and updates the time of a clock with the time of the incoming telephone call.

In one embodiment, the clock is comprised in the same unit as the caller ID decoder. Such an embodiment is shown in FIG. 1. Caller ID unit 10 is connected to the central office through a telephone line 13 connected to telephone port 11. Decoder 12 is coupled to telephone port 11 and is operable to receive the telephone signal. The telephone signal comprises ring signals, which a telephone can use to generate a ring sound, and caller ID information. Typically, caller ID information is transmitted between the first and second ring signals.

Decoder 12 is operable to receive and decode the caller ID information in order to obtain information about the identity of the caller. In one embodiment, decoder 12 is operable to determine the name of the caller, the telephone number of the caller, and the time and date of the incoming telephone call. In other embodiments of the invention, decoder 12 may operate to determine other attributes of the caller or of the telephone call, such as the carrier of the call, the address of the caller, the caller's email, world-wide-web, or other internet address, for example.

Decoder 12 is also operable to transmit the time of the incoming telephone call to automatically-updated clock 28 which is coupled to decoder 12. Clock 28 is operable to receive the signal containing the time information and update the time used by the clock.

Figure 2:
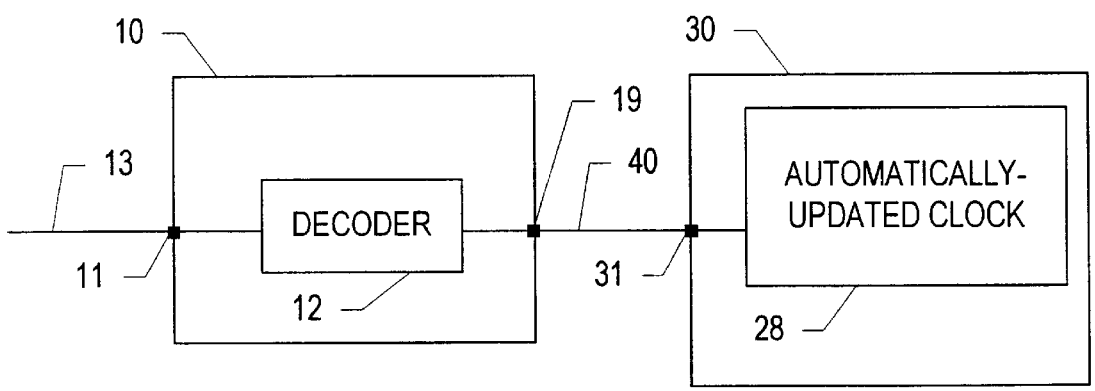
FIG. 2 shows another embodiment of a system for updating a clock using timing information received over a telephone line.

In another embodiment, clock 28 is comprised in a remote device 30, as shown in FIG. 2. For example, the remote device 30 that has clock 28 may be a regular desk-top clock, a clock radio, a wall clock, a television, a VCR, a personal computer or some other device that displays the time. Remote device 30 may also be a device that does not display the time but uses clock 28 for some other purpose, such as time-stamping. For example, remote device 30 may be an answering machine, a VCR, a personal computer, a security system, a cash register, or another such device.

In this embodiment, caller ID unit 10 is connected to the central office through telephone line 13 connected to telephone port 11. Decoder 12 is coupled to input port 11 and is operable to receive the telephone signal and the caller ID information it carries. From the caller ID information received during an incoming telephone call, decoder 12 determines the current time. Decoder 12 is coupled to an output port 19 on caller ID unit 10, and provides updating time information to output port 19 upon determining the current time from the incoming telephone call. An information link 40 couples output port 19 on the caller ID unit to an input port 31 on a remote device 30 that comprises automatically-updated clock 28. Clock 28 is coupled to input port 31 on the remote device, and receives the time information (when available) from input port 31. Clock 28 uses the time information to update itself, thereby maintaining the correct time. Clock 28 may also use the time information to reset itself if it does not have a valid time-for example after a power loss.

More than one remote device 30 may be coupled to decoder 12 for receiving the time information. Information link 40, which couples caller ID unit 10 to remote device 30, may be a simple electric cable, a specialized digital connection, an RF link, an IR link, or some other means for conveying data.

In a preferred embodiment, information link 40 is a home automation bus, such as those defined by the EIA-709 series specifications. The home automation bus is a system wherein various appliances and devices, such as caller ID unit 10 and clock 28, communicate with each other using low-amplitude modulated signals transmitted through the power grid (110–120 or 220–240 VAC) of a home or other building. In this embodiment of the present invention, one or more automatically-updated clocks that are connected to the building's power grid, such as stand-alone clocks or clocks in televisions, VCRs, microwave ovens, clock-radios, computers, answering machines, and other appliances and devices, reset themselves after power failures and keep the correct time using time information received from caller ID unit 10.

In other preferred embodiments, the caller ID information is used to update a clock in a portable telephone, such as a cordless telephone or a cellular telephone. FIG. 2 also illustrates an embodiment with a cordless telephone. In this embodiment, caller ID unit 10 is located in a base station of the cordless telephone. Remote device 30 is the handset of the cordless telephone. Clock 28 is comprised in the handset, which communicates through information link 40 with the base station. Information link 40 is preferably an RF link, but it may instead be an IR or other type of link.

FIG. 1 illustrates an embodiment with a cellular telephone. Decoder 12 and clock 28 are both comprised in a portable cellular-telephone handset. Telephone port 11 provides the telephone signal to decoder 12 after receiving it from a cellular telephone signal 13.

Figure 3:
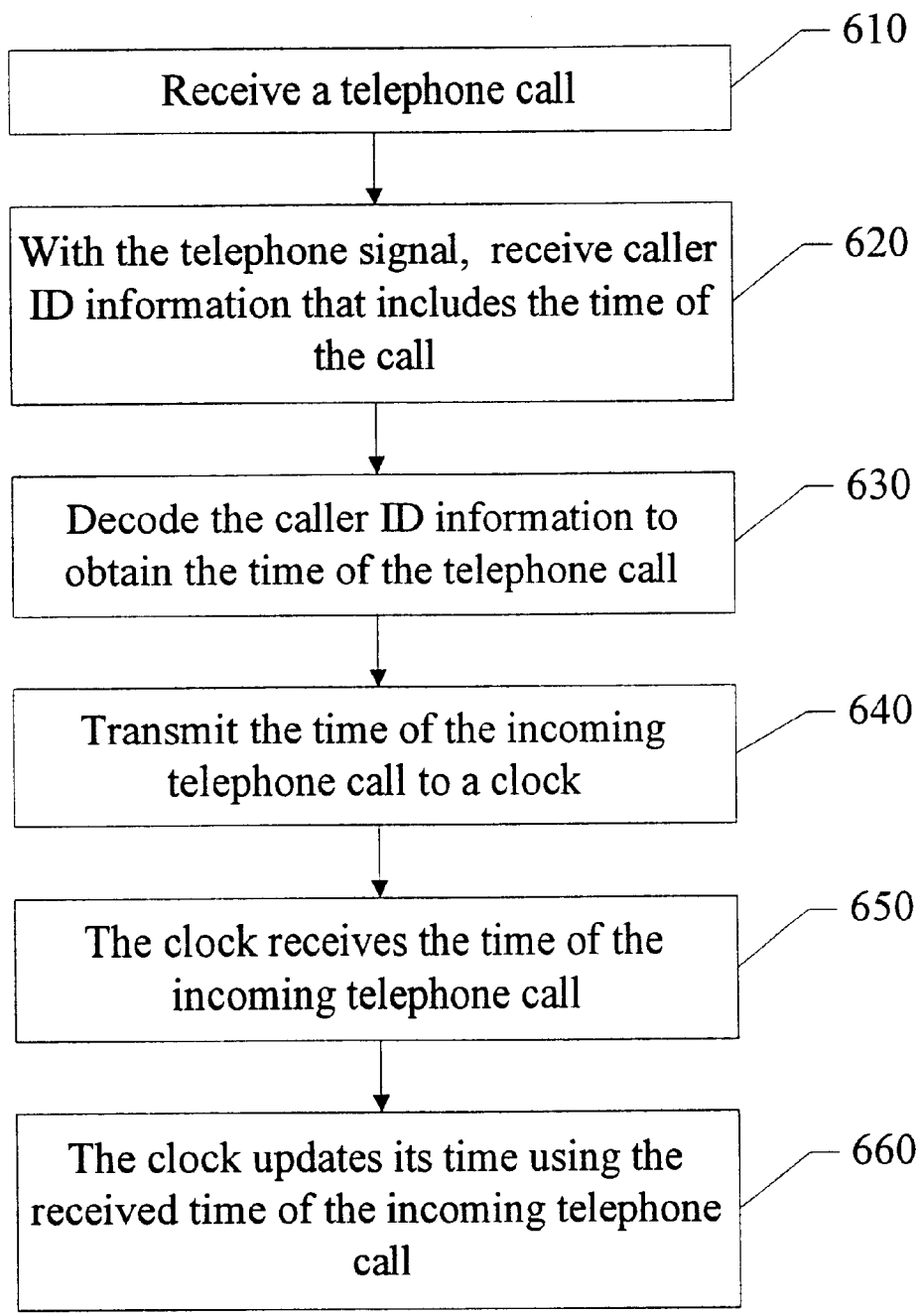
FIG. 3 is a flowchart for updating a clock using timing information received over a telephone line.

The flowchart in FIG. 3 indicates an embodiment of the procedure for updating a clock with the time received with the caller ID information. The procedure starts with the receiving of a telephone call in step 610. Caller ID information, including the current time, is received along with the call in step 620. In step 630, the current time is decoded from the caller ID information, and then transmitted to a clock in step 640. The transmission may occur through a dedicated cable, through a building wiring grid, or through an RF or IR communications link. In step 650, the clock receives the current time and then uses the received time to set the its time in step 660.

It is to be understood that multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only; the spirit and scope of the invention being limited only by the appended claims.

What is claimed is:

1. A method for automatically updating a clock in a remote device using caller ID information received at a telephony device, the method comprising:

receiving an incoming telephone call at the telephony device from a caller;

receiving caller ID information with the telephone call, wherein the caller ID information comprises a time of the incoming telephone call;

decoding the caller ID information to obtain the time of the incoming telephone call;

transmitting the time of the incoming telephone call to the remote device, wherein the remote device is coupled to the telephony device, wherein the remote device is located remotely with respect to the telephony device, wherein the remote device comprises a clock, wherein the remote device is operable to receive the time of the incoming telephone call and to update a time used by the clock with the received time of the incoming telephone call;

the remote device receiving the time of the incoming telephone call; and the remote device updating the time used by the clock with the received time of the incoming telephone call.

2. The method of claim 1, wherein the incoming telephone call is received through the public switched telephone network (PSTN).

3. The method of claim 1, wherein the caller ID information is received between a first and a second ring signals.

4. The method of claim 1, wherein the remote device comprises one of a clock, a clock radio, a wall clock, a television, a VCR, a microwave oven, a personal computer, a security system, or a cash register.

5. The method as recited in claim 4, wherein said device is a video cassette recorder (VCR).

6. The method as recited in claim 4, wherein said device is a personal computer system.

7. The method as recited in claim 4, wherein said device is a television.

8. The method as recited in claim 4, wherein said device is a clock radio.

9. The method of claim 1, wherein the remote device is coupled to the telephony device through a network.

10. A system for updating a clock in a remote device using caller ID information received at a telephony device, the system comprising:

a telephone port for coupling to a telephone line for receiving a telephone signal;

the telephony device, wherein the telephony device comprises a caller ID decoder, wherein the telephony device is operable to couple to said telephone port, wherein said telephony device is operable to receive the telephone signal, wherein the telephone signal contains caller ID information, wherein the caller ID information comprises the time of the incoming telephone call, and wherein said decoder is operable to decode the time of the incoming telephone call from the caller ID information;

a remote device operable to couple to said telephony device, wherein said remote device comprises a clock, wherein said remote device is operable to receive the time of the incoming telephone call from said telephony device, and wherein said remote device is operable to update a time used by said clock with the time of the incoming telephone call.

11. The system of claim 10, wherein the telephone signal is received through a public switched telephone network (PSTN).

12. The system of claim 10, wherein the caller ID information is received between a first and a second ring signals.

13. The system of claim 10, wherein the remote device comprises one of a clock, a clock radio, a wall clock, a television, a VCR, a microwave oven, a personal computer, a security system, or a cash register.

14. The system as recited in claim 13, wherein said device is a video cassette recorder (VCR).

15. The system as recited in claim 13, wherein said device is a personal computer system.

16. The system as recited in claim 13, wherein said device is a television.

17. The system as recited in claim 13, wherein said device is a clock radio.

18. The system of claim 10, wherein the remote device is coupled to the telephony device through a network.

* * * * *